United States Patent
Seeberg et al.

(10) Patent No.: US 9,797,237 B2
(45) Date of Patent: Oct. 24, 2017

(54) CONSTANT VOLUME TEMPERATURE TO PRESSURE TRANSDUCER FOR USE WITH RETRIEVABLE PRESSURE SENSOR ASSEMBLIES

(71) Applicant: General Electric Company, Schenectady, NY (US)

(72) Inventors: Bjørn Erik Seeberg, Oslo (NO); Christopher Grinde, Oslo (NO)

(73) Assignee: General Electric Company, Schenectady, NY (US)

( * ) Notice: Subject to any disclaimer, the term of this patent is extended or adjusted under 35 U.S.C. 154(b) by 521 days.

(21) Appl. No.: 14/543,520

(22) Filed: Nov. 17, 2014

(65) Prior Publication Data

US 2016/0138384 A1    May 19, 2016
US 2017/0191360 A9    Jul. 6, 2017

(51) Int. Cl.

| | |
|---|---|
| *G01K 13/00* | (2006.01) |
| *G01K 1/00* | (2006.01) |
| *E21B 47/06* | (2012.01) |
| *G01K 11/00* | (2006.01) |
| *G01V 9/00* | (2006.01) |
| *G01K 5/32* | (2006.01) |
| *E21B 41/00* | (2006.01) |

(52) U.S. Cl.
CPC ........ *E21B 47/065* (2013.01); *E21B 41/0007* (2013.01); *G01K 5/326* (2013.01); *G01K 11/00* (2013.01); *G01V 9/005* (2013.01)

(58) Field of Classification Search
USPC ........................................ 374/136, 208, 143
See application file for complete search history.

(56) References Cited

U.S. PATENT DOCUMENTS

| | | | |
|---|---|---|---|
| 2,667,184 | A | 1/1954 | Hailer et al. |
| 2,877,799 | A | 3/1959 | Hildenbrandt, Jr. |
| 3,102,427 | A | 9/1963 | Trostel |
| 3,986,399 | A | 10/1976 | Satou et al. |
| 4,227,420 | A | 10/1980 | Lamadrid |
| 4,923,444 | A | 5/1990 | Daoud et al. |
| 5,095,755 | A | 3/1992 | Peterson |
| 5,483,994 | A | 1/1996 | Maurer |
| 5,524,492 | A | 6/1996 | Frick et al. |
| 5,808,204 | A | 9/1998 | Chang |

(Continued)

FOREIGN PATENT DOCUMENTS

| | | |
|---|---|---|
| CN | 101308054 A | 11/2008 |
| CN | 101451895 A | 6/2009 |

(Continued)

OTHER PUBLICATIONS

U.S. Appl. No. 14/239,385, filed May 1, 2014, Vagle et al.
U.S. Appl. No. 13/498,292, filed Jun. 12, 2012, Seeberg et al.
U.S. Appl. No. 13/921,905, filed Jun. 19, 2013, Seeberg et al.
U.S. Appl. No. 13/581,968, filed Oct. 25, 2012, Vagle et al.
Norwegian Search Report issued in connection with related NO Application No. 20100384 dated Sep. 30, 2010.

(Continued)

*Primary Examiner* — Mirellys Jagan
(74) *Attorney, Agent, or Firm* — Armstrong Teasdale LLP

(57) ABSTRACT

A temperature sensor for measuring a temperature within a subsea installation includes a fixture portion coupled to the subsea installation and a retrievable portion that is selectively operable to couple to the fixture portion. The fixture portion includes a constant volume of a fluid disposed at a measurement point within the subsea installation. The retrievable portion includes a pressure sensing element operable to measure a pressure associated with the constant volume of fluid such that a temperature at the measurement point is determinable.

18 Claims, 4 Drawing Sheets

(56) References Cited

U.S. PATENT DOCUMENTS

| | | | |
|---|---|---|---|
| 6,873,267 | B1 | 3/2005 | Tubel et al. |
| 7,181,980 | B2 | 2/2007 | Wium |
| 7,258,017 | B1 | 8/2007 | Hedtke |
| 7,827,866 | B2 | 11/2010 | Galinsky |
| 7,859,681 | B2 | 12/2010 | Moroni et al. |
| 2001/0035052 | A1 | 11/2001 | Ohmi et al. |
| 2003/0200812 | A1 | 10/2003 | Kuhn et al. |
| 2004/0050168 | A1 | 3/2004 | Uberreiter |
| 2004/0234382 | A1 | 11/2004 | Textor |
| 2006/0048580 | A1 | 3/2006 | Vogler |
| 2006/0162458 | A1 | 7/2006 | Broden |
| 2006/0162460 | A1 | 7/2006 | Ooshiba et al. |
| 2008/0245152 | A1 | 10/2008 | Louwagie et al. |
| 2009/0107245 | A1 | 4/2009 | Banholzer et al. |
| 2012/0055669 | A1 | 3/2012 | Levin et al. |
| 2012/0247215 | A1 | 10/2012 | Seeberg |
| 2013/0004773 | A1 | 1/2013 | Klun et al. |

FOREIGN PATENT DOCUMENTS

| | | |
|---|---|---|
| CN | 201917428 U | 8/2011 |
| DE | 3700466 A1 | 7/1988 |
| DE | 9209083 U1 | 9/1992 |
| EP | 469535 A2 | 2/1992 |
| GB | 2377239 | 1/2003 |
| GB | 2377240 A | 1/2003 |
| GB | 2477714 | 8/2011 |
| JP | 54138461 A | 10/1979 |
| JP | 5576924 A | 6/1980 |
| JP | 60142227 A | 7/1985 |
| WO | 9627124 A1 | 9/1996 |
| WO | 03016673 | 2/2003 |
| WO | 03034014 A2 | 4/2003 |
| WO | 2008150176 A1 | 12/2008 |
| WO | 2009067016 A1 | 5/2009 |
| WO | 2011049459 | 4/2011 |
| WO | 2011115502 | 9/2011 |
| WO | 2013036144 | 3/2013 |
| WO | 2013050051 | 11/2013 |

OTHER PUBLICATIONS

Norwegian Search Report issued in connection with related NO Application No. 20100383 dated Oct. 16, 2010.
Roxar Subsea ROV Retrieval System Data Sheet, Version A-230210, Roxar, Oct. 16, 2010.
International Search Report and Written Opinion issued in connection with related PCT Application No. PCT/NO2010/000367 dated Jan. 14, 2011.
International Search Report and Written Opinion issued in connection with related PCT Application No. PCT/NO2011/000085 dated Aug. 29, 2011.
International Preliminary Report on Patentability issued in connection with related PCT Application No. PCT/NO2010/000367 dated Jan. 11, 2012.
Norwegian Search Report issued in connection with related NO Application No. 20111218 dated Apr. 8, 2012.
International Preliminary Report on Patentability issued in connection with related PCT Application No. PCT/NO2011/000085 dated Jun. 12, 2012.
International Search Report and Written Opinion issued in connection with related PCT Application No. PCT/NO2012/050170 dated Jun. 10, 2013.
International Preliminary Report on Patentability issued in connection with related PCT Application No. PCT/NO2012/050170 dated Nov. 26, 2013.
Non-Final Rejection towards related U.S. Appl. No. 13/498,292 dated Oct. 3, 2014.
Non-Final Rejection towards related U.S. Appl. No. 13/581,968 dated Oct. 15, 2014.
Unofficial English translation of Office Action issued in connection with related CN Application No. 201280043534.1 on Mar. 24, 2015.
Final Rejection towards related U.S. Appl. No. 13/498,292 dated Apr. 24, 2015.
Non-Final Rejection towards related U.S. Appl. No. 13/921,905 dated May 20, 2015.
Non-Final Rejection towards related U.S. Appl. No. 14/239,385 dated Nov. 2, 2015.
International Search Report and Written Opinion issued in connection with corresponding PCT Application No. PCT/US2015/050087 dated Dec. 18, 2015.

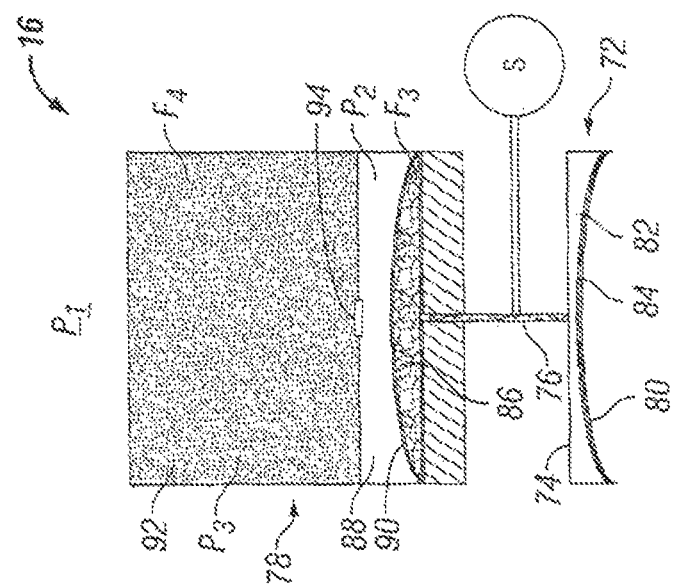
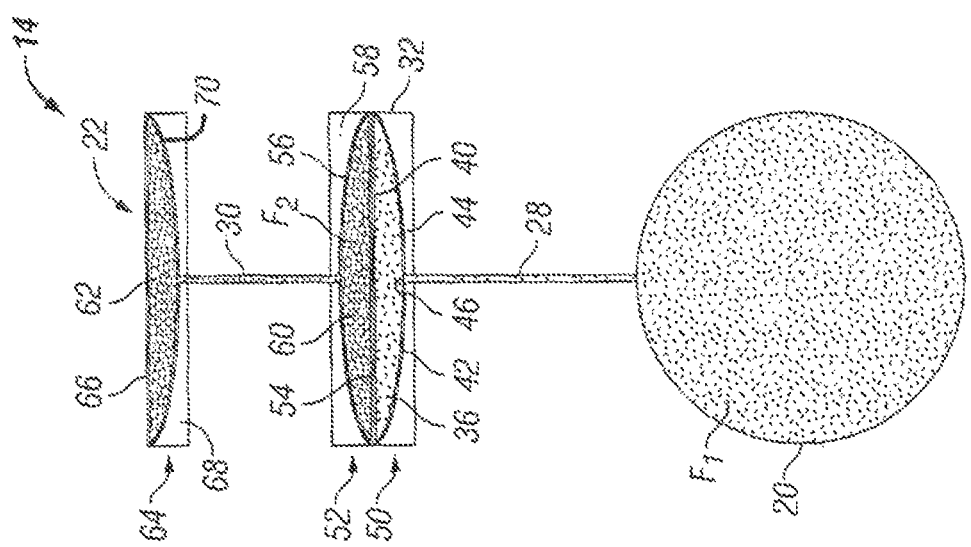
FIG. 2B
FIG. 2A

CONSTANT VOLUME TEMPERATURE TO PRESSURE TRANSDUCER FOR USE WITH RETRIEVABLE PRESSURE SENSOR ASSEMBLIES

RELATED APPLICATIONS

This patent application is a continuation-in-part of, and claims priority to and the benefit of U.S. patent application Ser. No. 13/921,905, to Vagle and Seeberg, filed on Jun. 19, 2013, titled "Retrievable Sensor and Method,"; and is a continuation-in-part of, and claims priority to and the benefit of U.S. patent application Ser. No. 13/581,968, to Vagle and Seeberg, filed on Oct. 25, 2012, titled "Retrievable Pressure Sensor," which is a national phase of and claims priority to PCT Patent Application No. PCT/NO2011/000085, filed on Mar. 16, 2011, titled "Retrievable Pressure Sensor." which claims priority to Norwegian Patent Application Nos. 20100384 & 20100383, both filed on Mar. 16, 2010, titled "Retrievable Pressure Sensor," and is related to U.S. patent application Ser. No. 14/239,385, to Vagle and Seeberg, which is a national phase of PCT Patent Application No. PCT/NO2012/050170, filed Sep. 7, 2012, titled "Retrievable Pressure Sensor," published as WO2013036144, which claims priority to Norwegian Patent Application No. 20111218, filed Sep. 8, 2011; and U.S. patent application Ser. No. 13/498,292, to Seeberg, filed Oct. 4, 2012, titled "Separating Membrane for Pressure Sensor," which is a national phase of PCT Patent Application No. PCT/N010/00367, filed Oct. 19, 2010, which claims priority to Norwegian Patent Application No. 20093171 filed Oct. 19, 2009, each incorporated herein by reference in its entirety.

BACKGROUND OF THE INVENTION

1. Field of the Invention

This present invention relates generally to monitoring the temperature of a fluid, e.g., a fluid within a subsea installation for oil or gas extraction or processing. In particular, the invention relates to a temperature sensor that employs a sensing element disposed at an accessible location and is operable to measure a temperature at a remote subsea location.

2. Description of the Related Art

In many applications in the production and processing of oil and gas, it is helpful to monitor the temperature of fluids flowing through a pipe or contained with a vessel. For example, in a subsea fluid extraction well, temperature sensors can be provided at downhole locations and within a subsea tree installed to control production from the well. The temperature sensors may be operable to monitor a temperature of hydrocarbons fluids flowing through the well and subsea tree and also to monitor the temperature of hydraulic fluids or mechanisms for operating various valves, actuators or control devices located on the subsea tree. The temperature readings provided by the sensors can facilitate optimization of production from the well and can be analyzed to predict and prevent equipment failure or dangerous conditions.

The operational life of the temperature sensors could be substantially shorter than the operational life of the fluid extraction well; at least since temperature sensors often employ electronics that are vulnerable to the subsea environment or high temperature. Thus, it may be necessary to replace the temperature sensors during the operational life of the well. In some instances, to permit replacement of the temperature sensors, it may be necessary to suspend operations of the well, which can be expensive and hazardous. For example, in some cases, valves are provided in a fluid conduit to suspend fluid flow through the conduit to isolate a temperature sensor that has failed from the fluid flowing through the conduit. However, since these valves are often left dormant for fifteen years or more while the temperature sensor is operational, these valves themselves can be subject to failure. Additionally, it can be difficult to avoid discharging the fluid into the ambient environment when valves are employed to replace a temperature sensor.

Moreover, the location of the measurement location can make replacement of the temperature sensors challenging. For example, when temperature readings of a fluid at a downhole location are required, replacement of a temperature sensor might require extraction and replacement of lengthy sections of equipment.

Accordingly, recognized is the need for a temperature sensor with a reliable structure that can be readily replaced. Also, recognized is the need for a temperature sensor operable to measure the temperature at a measurement point that is substantially remote from any electronics or other vulnerable components that often require replacement in a subsea environment.

SUMMARY OF THE INVENTION

In view of the foregoing, various embodiments of the present invention advantageously provide a temperature sensor for measuring a temperature within a subsea installation which includes a fixture portion coupled to the subsea installation and a retrievable portion that is selectively operable to couple to the fixture portion. The fixture portion includes a constant volume of a fluid disposed at a measurement point within the subsea installation. The retrievable portion includes a pressure sensing element operable to measure a pressure associated with the constant volume such that the temperature at the measurement point is determinable.

According to one aspect of the invention, a temperature sensor assembly for monitoring a temperature at a measurement point within a subsea installation includes a fixture portion operable to be installed within the subsea installation and a retrievable portion operable to selectively couple to the fixture portion. The fixture portion includes a constant volume container operable to be positioned at the measurement point, and the constant volume container is filled with a fixed volume of a temperature responsive fluid. An increase in temperature at the measurement point induces an increase in pressure of the temperature responsive fluid. The fixture portion also includes a fixture connector operable to be positioned at an accessible location on the subsea installation. The fixture connector includes a fixture connector reservoir bounded by a first ambient diaphragm and a first seating surface defining a first opening therein. The fixture connector reservoir is hydraulically coupled to the constant volume container through the first opening such that an increase in a pressure of the temperature responsive fluid urges the ambient diaphragm ambient away from the first seating surface. The retrievable portion includes a retrievable connector that is operable to couple the retrievable portion to the fixture portion. The retrievable connector includes a retrievable connector reservoir bounded by a second ambient diaphragm. The second ambient diaphragm is operably engaged with the first ambient diaphragm such that the second ambient diaphragm is urged away from the first seating surface by the first ambient diaphragm when the first ambient diaphragm is urged away from the first seating surface by an increase in the pressure of the temperature responsive fluid. A pressure within the retrievable connector reservoir increases in response to movement of the second ambient diaphragm away from the first seating surface. The retrievable portion further includes a pressure sensor that is operable to detect and measure a pressure within the retrievable connector reservoir.

According to another aspect of the present invention, a temperature sensor assembly for monitoring a temperature at a measurement point within a subsea installation includes a retrievable connector having a retrievable connector reservoir bounded by an ambient diaphragm and a seating surface having an opening therein. The ambient diaphragm is urged into contact with the seating surface by an exterior pressure. The temperature sensor assembly also includes a pressure sensor operable to detect and measure a pressure within the retrievable connector reservoir. An actuator is provided that is selectively operable to urge the ambient diaphragm away from the seating surface to thereby hydraulically couple the retrievable connector reservoir to a constant volume container disposed at the measurement point. The fixed volume container is filled with a constant volume of a temperature responsive fluid that increases in pressure in response to an increase in temperature at the measurement point.

According to another aspect of the present invention, a method of measuring a temperature at a measurement point within a subsea installation includes the steps of (i) installing a constant volume container at the measurement point, the constant volume container filled with a fixed volume of a temperature responsive fluid such that an increase in temperature at the measurement point induces an increase in pressure of the temperature responsive fluid, (ii) installing a fixture connector at an accessible location on the subsea installation, the fixture connector including a fixture connector reservoir bounded by a first ambient diaphragm and a first seating surface defining a first opening therein, the fixture connector reservoir hydraulically coupled to the constant volume container through the first opening such that an increase in a pressure of; the temperature responsive fluid urges the ambient diaphragm away from the seating surface, (iii) coupling a retrievable connector to the fixture connector, the retrievable connector including a retrievable connector reservoir bounded by a second ambient diaphragm and a second seating surface defining a second opening therein, (iv) actuating the second ambient diaphragm to engage the second ambient diaphragm with the first ambient diaphragm to thereby hydraulically couple the retrievable connector reservoir to the constant volume container and (v) measuring a pressure within the retrievable connector reservoir from which the temperature at the measurement point is determinable.

BRIEF DESCRIPTION OF THE DRAWINGS

So that the manner in which the features and advantages of the invention, as well as others which will become apparent, may be understood in more detail, a more particular description of the invention briefly summarized above may be bad by reference to the embodiments thereof; which are illustrated in the appended drawings, which form a part of this specification. It Is to be noted, however, that the drawings illustrate only various embodiments of the invention and are therefore not to be considered limiting of the invention's scope as it may include other effective embodiments as well.

FIGS. 2A and 2B are schematic views of the fixture portion and the retrievable portion, respectively, of the temperature sensor of FIG. 1.

DETAILED DESCRIPTION

The present invention will new be described more fully hereinafter with reference to the accompanying drawings, which illustrate embodiments of the invention. This invention may, however, be embodied in many different forms and should not be construed as limited to the illustrated embodiments set forth herein. Rather, these embodiments arc provided so that this disclosure will be thorough and complete, and will fully convey the scope of the invention to those skilled in the art. Like numbers refer to like elements throughout. Prime notation, if used, indicates similar elements in alternative embodiments.

Figure 1:
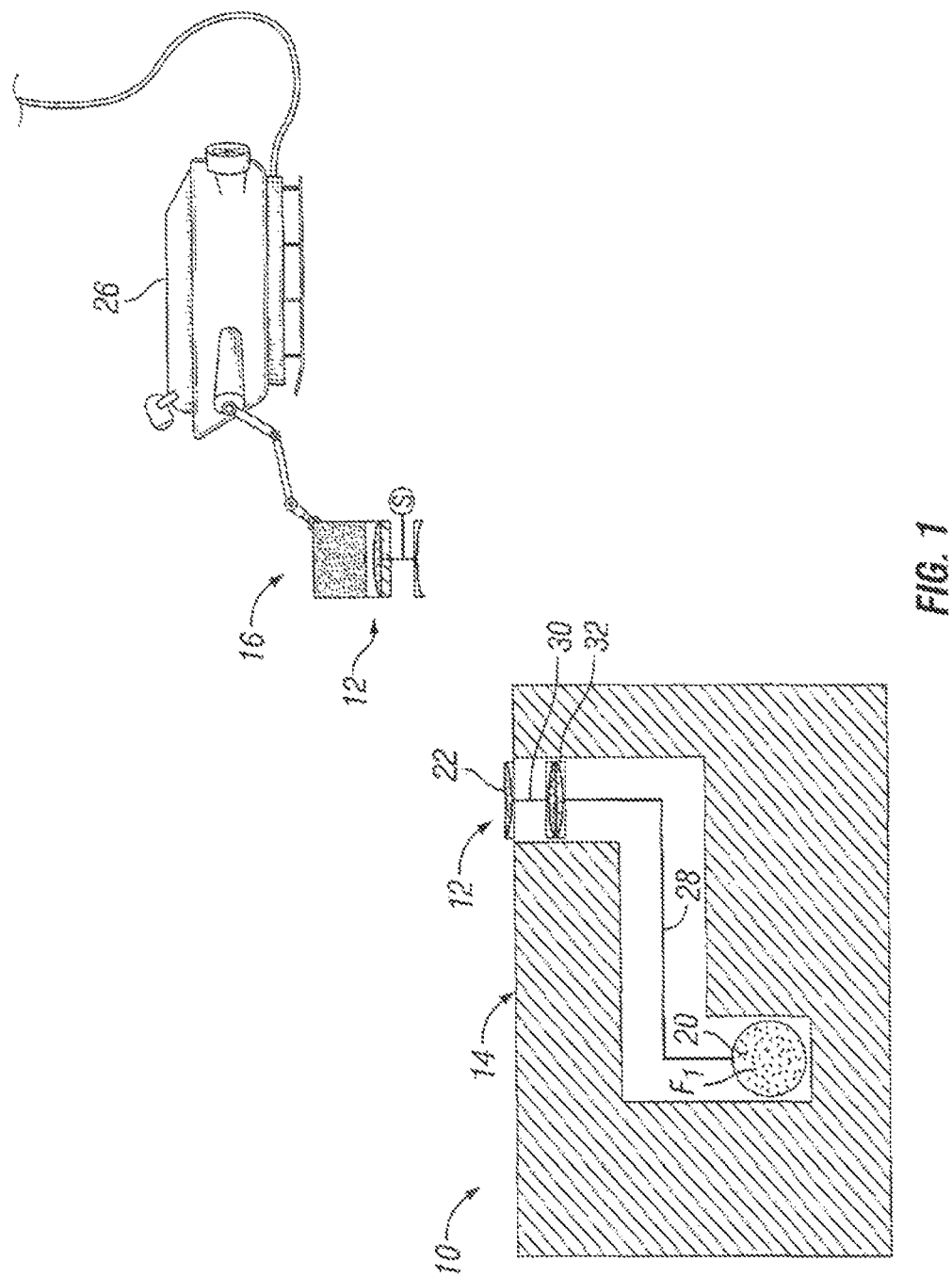
FIG. 1 is an schematic environmental view of a subsea system including a subsea installation with a fixture portion of a temperature sensor installed therein and a remotely operated vehicle carrying a retrievable portion of the temperature sensor in accordance with an example embodiment of the present invention.

Referring to FIG. 1, subsea installation 10 is an example subsea device, which illustrates example aspects of the present invention. Subsea installation 10 can be a subsea tree coupled to a well for the extraction of hydrocarbons such as oil and natural gas. In other embodiments, subsea installation 10 can be a subsea pipeline, or a manifold of another subsea fluid system. As will be appreciated by those skilled in the art, various aspects of the invention can be practiced on surface equipment as well.

A temperature sensor 12 is provided for measuring a temperature within subsea installation 10. Temperature sensor 12 includes a fixture portion 14 and a retrievable portion 16. The fixture portion 14 is operable to be coupled, fixed or installed within subsea installation 10, and the retrievable portion 16 is operable to be selectively coupled to the fixture portion 14.

The fixture portion 14 includes a constant volume container 20 and a connector 22 for coupling to the retrievable portion 16. Constant volume container 20 is disposed at a location within subsea installation 10 where a temperature reading is desired. This location can be relatively inaccessible such as an interior location substantially spaced from exterior surfaces of the subsea installation 10, and/or a location below the seabed. Connector 22 is disposed at a location on the subsea installation 10 that is relatively accessible to a remotely operated vehicle 26 for installing the retrievable portion 16 of the temperature sensor 12. In other embodiments, retrievable portion 16 can be installed by divers, surface operators or by other methods and mechanisms known in the art. The connector 22 and the constant volume container 20 are operably coupled to one another through capillary tubes 28, 30 and an overload protection module 32 as described in greater detailed below. The capillary tubes 28, 30 can extend relatively long distances into the subsea installation 10 such that the constant volume container 20 can be disposed remotely with respect to the retrievable portion 16.

Referring to FIG. 2A, the constant volume container 20 is disposed at a first end of the fixture portion 14, and is constructed of a substantially rigid or flexible material maintaining a constant volume therein. The constant volume container 20 is operable to transmit heat between an exterior environment into which the constant volume container 20 is placed and a fixed quantity of a first fluid "$F_1$" disposed within an interior of the constant volume container 20. In some embodiments, the constant volume container 20 is constructed as a glass bulb, rubber bladder or other structure, although the invention is not limited to the use of any such structures. The first fluid "$F_1$" can include a compressible gas, liquid and/or other fluid as known in the art. The constant volume container 20 can be charged with the fixed quantity of the first fluid "$F_1$" in an environment at or below the lowest temperature to be measured by the temperature sensor 12. In this manner, a minimum operational pressure is defined within the constant volume container 20. As those skilled in the art will appreciate, live temperature of the first fluid "$F_1$" within the constant volume container 20 is determinable from a pressure reading of the first fluid "$F_1$."

The constant volume container 20 is in fluid communication with capillary tube 28 such that the capillary tube 28 is filled with the first fluid "$F_1$." In some embodiments, the capillary tube 28 has an inner diameter of about 0.25 mm (about 0.01 inches). The capillary tube 28 extends between the constant volume container 20 and a first chamber 36 of the overload protection module 32 such that the first chamber 36 is filled with the first fluid "$F_1$." The first fluid "$F_1$" is sealed within the confines of the constant volume container 20, capillary tube 28 and the first chamber 36.

The first chamber 36 of the overload protection module 32 is defined on one end by a protection diaphragm 40 and on an opposite end by seating surface 42 defined in a base member 44. The seating surface 42 includes an opening 46 defined therein, which is in fluid communication with live capillary tube 28. In some embodiments, the opening 46 is approximately the size of the inner diameter of the capillary tube 28, or about 0.25 mm. The protection diaphragm 40 is constructed of a relatively flexible material such as sheet metal or foil, and in some embodiments, can have a thickness of about 0.05 mm (about 0.002 inches). The protection diaphragm 40 can be constructed, e.g., in any of the forms described in U.S. Patent Application Publication No. 2012/0247215 entitled SEPARATING MEMBRANE FOR PRESSURE SENSOR, the entire content of which is hereby incorporated by reference herein. The seating surface 42 is concavely curved such that a central portion of the seating surface 42 is spaced a greater distance from the protection diaphragm 40 than lateral edges of the seating surface 42. The seating surface 42 provides an abutment surface against which protection diaphragm 40 can abut, and which prevents the protection diaphragm 40 from rupturing should the pressure of the first fluid "$F_1$" become too high. The operation of the seating surface 42 is described in greater detail within U.S. patent application Ser. No. 14/239,385 entitled RETRIEVABLE PRESSURE SENSOR, the entire content of which is hereby incorporated by reference herein.

In the illustrated embodiment, perimeter or lateral edges of the protection diaphragm 40 are fastened and sealed to the base member 44 around the lateral edges of the seating surface 42 such that the protection diaphragm 40 is operable to engage and/or conform to the shape of the seating surface 42 when a force is applied to the protection diaphragm 40 in the direction of the seating surface 42 (see, e.g., FIG. 2B). The first fluid "$F_1$" within the first chamber 36 can be forced through the capillary tube 28 and into the constant volume container 20 when such a force is applied to the protection diaphragm 40.

Together, the protection diaphragm 40 and the base member 44 define a separation unit 50, which is operable to separate fluids on either side of the protection diaphragm 40. The overload protection module 32 can be constructed of a pair of separation units 50, 52 oriented such that the protection diaphragm 40 of separation unit 50 engages a diaphragm 54 of separation unit 52. Each protection diaphragm 40, 54 is operable to urge the other protection diaphragm 40, 54 toward the respective seating surfaces 42, 56 on respective base members 44, 58 as described in greater detail below. Alternatively, a single protection diaphragm 40 can be provided between the seating surfaces 42, 56. A second chamber 60 is defined within base member 58, and the second chamber 60 is filled with a second fluid "$F_2$." The second fluid "$F_2$" is a pressure-transferring fluid, and in some embodiments, second fluid "$F_2$" can include a hydraulic liquid such as hydraulic oil.

The separation unit 52 is fluidly coupled to the connector 22 by capillary tube 30 such that the second fluid $F_2$ fills the second chamber 58, the capillary tube 30 and a third chamber 62 defined by the connector 22. The connector 22 includes a separation unit 64 having a diaphragm 66 and a base member 68 defining a seating surface 70 for the diaphragm 66. The diaphragm 66 provides a barrier between an ambient environment, such as a subsea environment, and the second fluid $F_2$ and thus constitutes an "ambient diaphragm." As one skilled in the art will recognize, connector 22 also includes threads, latches, and/or other engagement features (not shown) for coupling the retrievable portion 16 to the fixture portion 14 of temperature sensor 12.

The diaphragm 66 is in hydraulic communication with the constant volume container 20 such that the diaphragm 66 is responsive to a pressure of the first fluid "$F_1$" within the constant volume container 20. In particular, the pressure of the first fluid "$F_1$" is transmissible to protection diaphragm 40, which engages diaphragm 54 to transfer a force thereto. The diaphragm 54 engages second fluid "$F_2$" to communicate the pressure thereto, and the second fluid "$F_2$" engages the diaphragm 66 to transfer a force thereto. As one skilled in the art will recognize, the force applied to the diaphragm 66 can be proportional, or otherwise predictably related to the pressure of the first fluid "$F_1$" within the constant volume container 20. Although the different parts of the temperature sensor 12 are referred to herein as containing fluids $F_1$ and $F_2$ (as well as $F_3$ and $F_4$ below), these fluid volumes may consist in practice of two or more fluid volumes each whose fluid does not need to be the same.

Referring to FIG. 2B, the retrievable portion 16 of the temperature sensor 12 includes a connector 72 including a separation unit 74, a capillary tube 76, a pressure transducer or sensor "S" and an actuator 78. The connector 72 includes engagement features (not shown) for engaging the engagement features of the connector 22 (FIG. 2A). The separation unit 74 includes a diaphragm 80 and a base member 82 defining a concave seating surface 84 for the diaphragm 80. The separation unit 74 is in fluid communication with the actuator 78 through the capillary tube 76.

A third fluid "$F_3$" is disposed within a reservoir 86 defined in the actuator 78. In some embodiments, the third fluid "$F_3$" is pressure-transferring fluid such as hydraulic oil. The reservoir 86 is connected to capillary tube 76 such that the third fluid "$F_3$" fills both the reservoir 86 and the capillary tube 76. The reservoir 86 extends into an evacuated compartment 88, and is separated from the evacuated compartment 88 by a diaphragm 90. As illustrated in FIG. 2B, the retrievable portion 16 is disposed in an ambient environment exhibiting an ambient pressure "$P_1$" that is greater than an internal pressure "$P_2$" of the evacuated compartment. The ambient pressure "$P_1$" operates to press diaphragm 80 against seating surface 84 and against the third fluid "$F_3$" within the capillary tube 76. A force applied to the third fluid "$F_3$" by diaphragm 80 is transmitted through the third fluid "$F_3$" to the diaphragm 90. Diaphragm 90 is thereby pressed into the evacuated compartment 88.

The pressure transducer or pressure sensor "S" is in hydraulic communication with capillary tube 76 and is operable to monitor a pressure of the third fluid "$F_3$" therein. The pressure sensor "S" is also operable to transmit pressure readings to an operator at a remote location through wired or wireless connections as will be appreciated by those skilled in the art.

A fourth fluid "$F_4$" is contained within a pressurized chamber 92 defined within the actuator 78. In some embodiments, the fourth fluid "$F_4$" is pressurized gas exhibiting a third pressure "$P_3$" that is higher than the ambient pressure "$P_1$" in which the temperature sensor is operable. A valve 94 is provided between the pressurized chamber 92 and the evacuated compartment 88. The valve 94 is selectively operable to release a portion of the fourth fluid "$F_4$" from the pressurized chamber 92 into the evacuated compartment 88. In some embodiments, the pressurized chamber 92 has volume that is many times greater than a volume of the evacuated compartment 88. Thus, when the fourth fluid "$F_4$" is released into the evacuated compartment 88 the fourth fluid "$F_4$" the fourth fluid "$F_4$" maintains a pressure that is higher than the ambient pressure "$P_1$." In some embodiments, the valve 94 is a rupture disk or other mechanism configured for one-time operation.

Figure 3A:
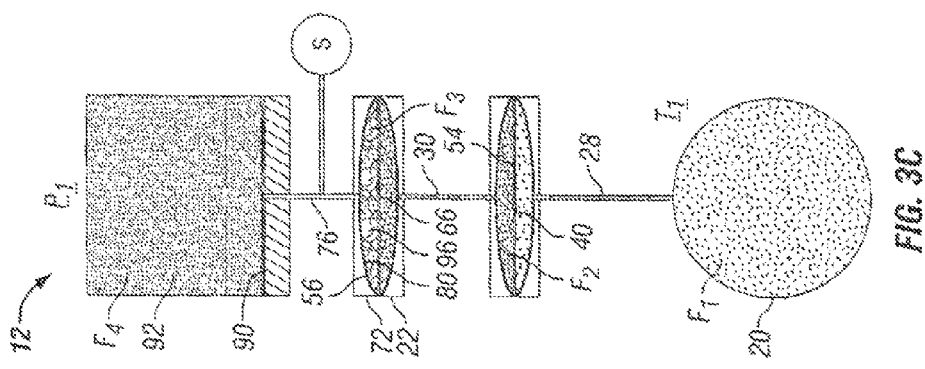
FIGS. 3A through 3E are schematic views of the temperature sensor of FIG. 1 illustrating a sequence for installing, using and de-coupling the retrievable portion and the fixture portion.
Figure 3B:
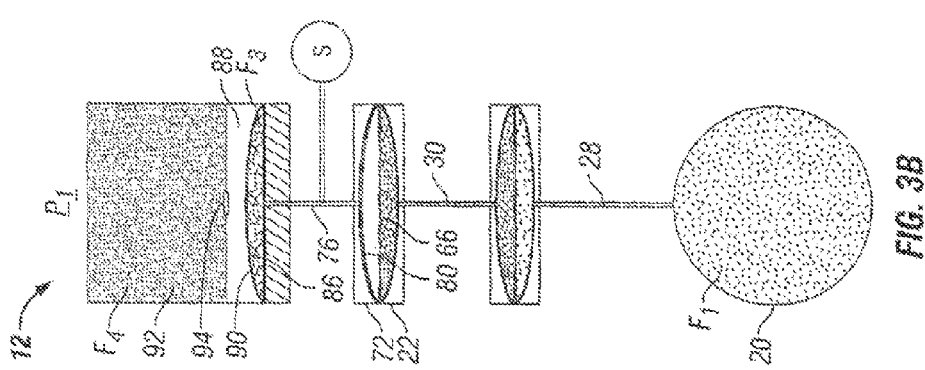

Referring to FIGS. 3A through 3E, one example operational procedure for using the temperature sensor 12 according an embodiment of the present disclosure 12 is described. Initially, fixture portion 14 is installed in the subsea installation 10 (FIG. 1). Next, the retrievable portion 16 is approximated with fixture portion 14 such that the connectors 22,72 are aligned (FIG. 3A). The diaphragms 66, 80 are both exposed to the ambient environment at the ambient pressure "P1." The valve 94 is closed such that the fourth fluid "$F_4$" is maintained within the pressurized chamber 92 and third fluid "$F_3$" presses the reservoir 86 into the evacuated compartment 88. Next, the connectors 22, 72 are coupled to one another (FIG. 3B) to affix the retrievable portion 16 to the fixture portion 14. Then, to hydraulically couple the constant volume container 20 to the pressure sensor "S," the valve 94 is opened (FIG. 3C) and a portion of the fourth fluid "$F_4$" enters the evacuated compartment 88. The fourth fluid "$F_4$" presses against the diaphragm 90, which forces a portion of the third fluid "$F_3$" through capillary tube 76 and into a reservoir 96 defined within the connector 72. The diaphragm 80 is thereby pressed into engagement with the diaphragm 66.

Figure 3C:
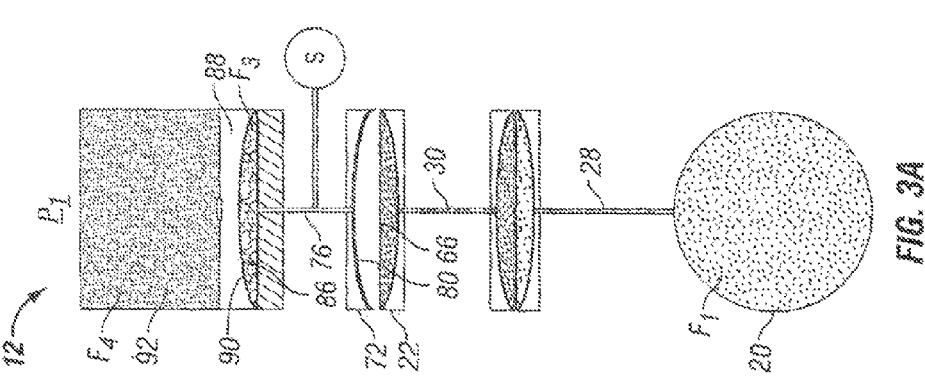

In the operational configuration of FIG. 3C, the ambient temperature in which the constant volume container 20 is disposed is determinable from pressure readings available from the pressure sensor "S." If the ambient temperature around constant volume container 20 increases, the pressure of the third fluid "$F_3$" sensed by the pressure sensor "S" also increases in a predictable manner. The increased ambient, temperature "$T_1$" will serve to increase the pressure of the first fluid "$F_1$" according to the combined gas law, for example. This increased pressure will be transmitted to the third fluid "$F_3$" though the pair of engaged diaphragms 40, 54, the second fluid "$F_3$" and the pair of engaged diaphragms 66, 80. In particular, the increased pressure of; the first fluid "$F_1$" urges the protection diaphragm 40 in a direction away from the seating surface 42, and the protection diaphragm 40, in turn, urges the diaphragm 54 in a direction toward the seating surface 56. The diaphragm 54 urges the pressure-transferring second fluid "$F_2$" toward the diaphragm 66, which, in presses against diaphragm 80. The diaphragm 80 is thereby urged toward the seating surface 84, which increases the pressure of the third fluid "$F_3$" in the reservoir 96 and capillary tube 76. This pressure is measured by pressure sensor "S," and the pressure readings can be employed by a user, electronics or software to calculate the ambient temperature "$T_1$" therefrom.

The retrievable portion 16 can be removed from the fixture portion 14, e.g., in the event that the pressure transducer or sensor "S" experiences a failure. The fixture portion 16 can be constructed without any electrical components, and thus, can be more reliable in a subsea environment than the retrievable portion 16. The fixture portion 14 can remain installed in the subsea installation 10 (FIG. 1) once the retrievable portion 16 is removed to allow for a new, repaired or refurbished retrievable portion 16 to be coupled to the connector 22.

Figure 3D:
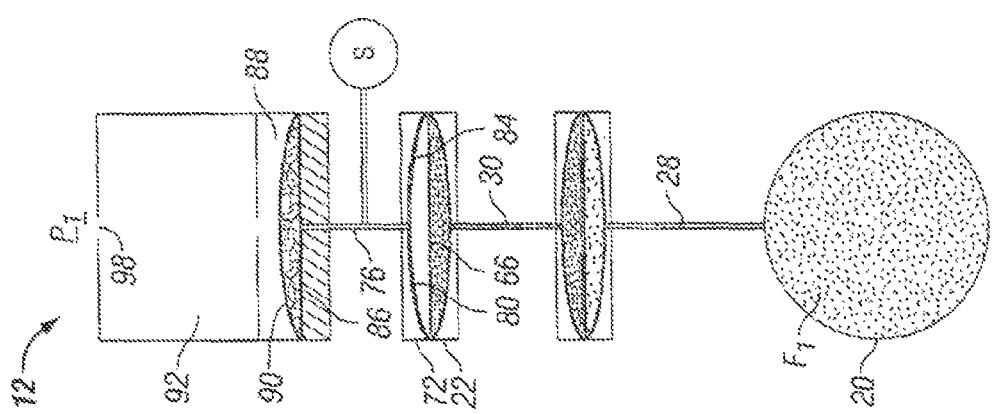
Figure 3E:
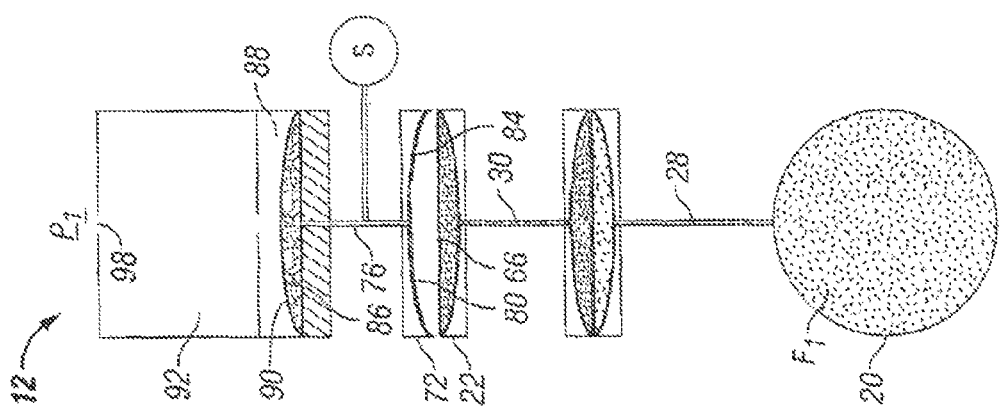

To de-couple the retrievable portion 16 from the fixture portion 16, an opening 98 can be formed in the pressurized chamber 92 (FIG. 3D). The opening 98 can be formed by opening a valve member (not shown), or in some embodiments forming a new opening 98 by drilling, puncturing the vessel, or unplugging a hole. The fourth fluid "$F_4$" is vented through the opening 98, thereby reducing the pressure within the pressurized chamber 92 and evacuated compartment 88. This redaction in pressure permits the third fluid "$F_3$" to return to reservoir 86 in the evacuated compartment 88, thereby disengages diaphragm 80 from diaphragm 66 and re-engages diaphragm 80 with seating surface 84. With the diaphragm 80 disengaged from diaphragm 66, the connectors 22, 72 can be disengaged and separated from one another (FIG. 3E).

Once the connectors 22, 72 are disengaged, the retrievable portion 16 can be removed leaving diaphragm 66 exposed to the ambient environment. The overload protection module 32 prevents rupture of the diaphragm 66 while the retrievable portion 16 is disengaged. For example, if there is a large increase in the ambient temperature "$T_1$" while the retrievable portion 16 is disengaged, the corresponding increase in the pressure of the first fluid "$F_4$" is not permitted to fully propagate to the diaphragm 66. The diaphragm 54 will be urged into contact with seating surface 56, thereby limiting the amount of pressure that can propagate through the second fluid "$F_2$" to the diaphragm 66. The diaphragm 66 is thereby protected.

Once the connectors 22, 72 are disengaged, a replacement retrievable portion 14 can be operatively coupled to the fixture connector 22, and a pressure can be measured within a replacement retrievable connector reservoir from which the temperature at the measurement point is determinable as described above. In this manner, the more sensitive components of the retrievable portion 16 can be replaced, and the more durable components of the fixture portion can be re-used.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

The invention claimed is:

1. A temperature sensor assembly for monitoring a temperature at a measurement point within a subsea installation, the temperature sensor assembly comprising:
a fixture portion operable to be installed within the subsea installation, the fixture portion comprising:

a constant volume container operable to be positioned at the measurement point, the constant volume container filled with a fixed volume of a temperature responsive fluid such that an increase in a temperature at the measurement point induces an increase in a pressure of the temperature responsive fluid; and a fixture connector operable to be positioned at an accessible location on the subsea installation, the fixture connector including a fixture connector reservoir bounded by a first ambient diaphragm and a first seating surface, the fixture connector reservoir hydraulically coupled to the constant volume container such that an increase in a pressure of the temperature responsive fluid urges the first ambient diaphragm away from the first seating surface; and a retrievable portion operable to selectively couple to the fixture portion, the retrievable portion comprising:

a retrievable connector operable to couple the retrievable portion to the fixture portion, the retrievable connector including a retrievable connector reservoir bounded by a second ambient diaphragm, the second ambient diaphragm operably engaged with the first ambient diaphragm such that the second ambient diaphragm is urged away from the first seating surface by the first ambient diaphragm when the first ambient diaphragm is urged away from the first seating surface by an increase in the pressure of the temperature responsive fluid, and wherein a pressure within the retrievable connector reservoir increases in response to movement of the second ambient diaphragm away from the first seating surface; and a pressure sensor operable to detect and measure the pressure within the retrievable connector reservoir.

2. The temperature sensor assembly according to claim 1, wherein the constant volume container is in hydraulic communication with the fixture connector reservoir through at least one capillary tube.

3. The temperature sensor assembly according to claim 1, further comprising an overload protection module fluidly coupled between the constant volume container and the fixture connector, the overload protection module including a protection diaphragm and a first protection seating surface, wherein the protection diaphragm is configured to engage the first protection seating surface in response to a minimum overload pressure in the temperature responsive fluid.

4. The temperature sensor assembly according to claim 3, wherein the overload protection module further includes a second protection seating surface opposite the first protection seating surface, wherein a second protection diaphragm is configured to engage the second protection seating surface in response to a minimum overload ambient pressure.

5. The temperature sensor assembly according to claim 4, further comprising a pressure-transferring fluid disposed between and in contact with the second protection diaphragm and the first ambient diaphragm such that the pressure-transferring fluid is operable to communicate a pressure from the constant volume container to the fixture connector reservoir.

6. The temperature sensor assembly according to claim 1, wherein the retrievable connector reservoir is further bounded by a second seating surface hydraulically coupled to the pressure sensor via a capillary tube, and wherein the pressure sensor is operable to detect and measure the pressure within the retrievable connector reservoir through the capillary tube.

7. The temperature sensor assembly according to claim 6, wherein the second ambient diaphragm is operable to engage the second seating surface under the influence of an ambient pressure when the retrievable connector is decoupled from the fixture connector.

8. The temperature sensor assembly according to claim 7, wherein the second seating surface is concavely shaped and wherein the second ambient diaphragm is conformable to the concave shape under the influence of the ambient pressure.

9. The temperature sensor assembly according to claim 7, wherein the retrievable portion of the temperature sensor assembly further includes an actuator that is selectively operable to urge the second ambient diaphragm away from the second seating surface and into contact with the first ambient diaphragm when the retrievable connector is coupled to the fixture connector.

10. The temperature sensor assembly according to claim 9, wherein the actuator includes a pressurized actuation fluid selectively releasable from a pressurized container to urge a pressure transferring fluid into the retrievable connector reservoir.

11. A temperature sensor assembly for monitoring a temperature at a measurement point within a subsea installation, the temperature sensor assembly comprising:

a retrievable connector including a retrievable connector reservoir bounded by an ambient diaphragm and a seating surface, wherein the ambient diaphragm is urged into contact with the seating surface by an exterior pressure;

a pressure sensor operable to detect and measure a pressure within the retrievable connector reservoir; and an actuator that is selectively operable to urge the ambient diaphragm away from the seating surface to thereby hydraulically couple the retrievable connector reservoir to a constant volume container that is disposed at the measurement point and is filled with a fixed volume of a temperature responsive fluid that increases in pressure in response to an increase in temperature at the measurement point.

12. The temperature sensor assembly according to claim 11, wherein the actuator includes a pressurized actuation fluid selectively releasable from a pressurized container to urge a pressure transferring fluid into the retrievable connector reservoir.

13. The temperature sensor assembly according to claim 12, wherein the actuator further comprises an evacuated compartment, wherein the pressure transferring fluid is disposed within a reservoir that extends into the evacuated compartment when the ambient diaphragm is urged into contact with the seating surface, and wherein the pressurized actuation fluid is releasable into the evacuated compartment to urge the pressure transferring fluid from the evacuated compartment toward the retrievable connector reservoir.

14. The temperature sensor assembly according to claim 13, further comprising a flexible diaphragm disposed within the evacuated compartment, the flexible diaphragm operably coupled to the pressure transferring fluid such that when the pressurized actuation fluid is released into the evacuated compartment, the flexible diaphragm transfers a pressure from the pressurized actuation fluid to the pressure transferring fluid.

15. A method of measuring a temperature at a measurement point within a subsea installation, the method comprising:

installing a constant volume container at the measurement point, the constant volume container filled with a fixed volume of a temperature responsive fluid such that an increase in a temperature at the measurement point induces an increase in a pressure of the temperature responsive fluid;

installing a fixture connector at an accessible location on the subsea installation, the fixture connector including a fixture connector reservoir bounded by a first ambient diaphragm and a first seating surface, the fixture connector reservoir hydraulically coupled to the constant volume container such that an increase in the pressure of the temperature responsive fluid urges the first ambient diaphragm away from the first seating surface;

coupling a retrievable connector to the fixture connector, the retrievable connector including a retrievable connector reservoir bounded by a second ambient diaphragm and a second seating surface;

actuating the second ambient diaphragm to engage the second ambient diaphragm with the first ambient diaphragm to thereby hydraulically couple the retrievable connector reservoir to the constant volume container;, and measuring a pressure within the retrievable connector reservoir from which the temperature at the measurement point is determinable.

16. The method according to claim 15, further comprising:

urging a pressure-transferring fluid into the retrievable connector reservoir to thereby urge the second ambient diaphragm away from the second seating surface.

17. The method according to claim 16, wherein urging the pressure-transferring fluid into the retrievable connector reservoir includes releasing a pressurized actuation fluid from a pressurized container into an evacuated compartment, and wherein the pressurized actuation fluid urges the pressure-transferring fluid from the evacuated compartment to the retrievable connector reservoir.

18. The method according to claim 17, further comprising:

venting the pressurized actuation fluid from the evacuated compartment to thereby permit the pressure-transferring fluid to exit the retrievable connector reservoir and to permit the second ambient diaphragm to disengage the first ambient diaphragm;

decoupling the retrievable connector from the fixture connector;

replacing the retrievable connector with a replacement retrievable connector by coupling the replacement retrievable connector to the fixture connector, and measuring the pressure within a replacement retrievable connector reservoir in the replacement retrievable connector from which the temperature at the measurement point is determinable.

* * * * *